United States Patent [19]

Darbois

[11] Patent Number: 4,610,069
[45] Date of Patent: Sep. 9, 1986

[54] PROCESS FOR FORMING REMOVABLE FLUID TIGHT SEALING CONNECTIONS FOR HIGH PRESSURE DUCTS

[75] Inventor: Claudine Darbois, Le Plessis-Robinson, France

[73] Assignee: Electricite de France, France

[21] Appl. No.: 706,644

[22] Filed: Feb. 28, 1985

[30] Foreign Application Priority Data

Feb. 28, 1984 [FR] France ............................... 84 03059

[51] Int. Cl.[4] ...................... B23P 17/00; B21D 39/00; F16L 13/14
[52] U.S. Cl. ............................. 29/421 M; 29/421 R; 29/507; 285/382.7
[58] Field of Search .................... 285/382.7; 29/421 R, 29/421 M, 507, 509

[56] References Cited

U.S. PATENT DOCUMENTS

| 3,972,547 | 8/1976 | Itoya | 285/382.7 |
| 4,170,887 | 10/1979 | Baranov | 29/421 M |
| 4,260,182 | 4/1981 | Bruner | 285/382.7 |
| 4,403,385 | 9/1983 | Kirk | 29/507 |
| 4,498,220 | 2/1985 | Fiegen et al. | 29/421 R |

Primary Examiner—Howard N. Goldberg
Assistant Examiner—Steven Nichols
Attorney, Agent, or Firm—Larson & Taylor

[57] ABSTRACT

For forming a fluid tight removable connection between a high pressure tube and a sleeve, an olive is sealingly secured to an end portion of the tube by electromagnetic forming. Then a nut is threaded on the sleeve for deforming the olive and forcing it sealingly against an internal face of the sleeve. When the olive is at least partially of electrically conducting material, it is shrunk onto the tube by magnetoforming after a removable forming die has been inserted into the tube.

4 Claims, 4 Drawing Figures

FIG. 1.
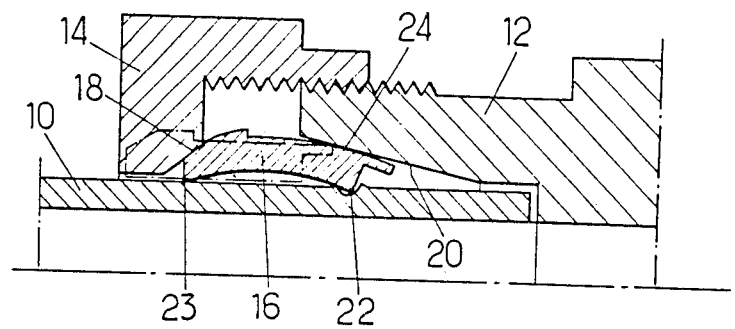
FIG. 2.
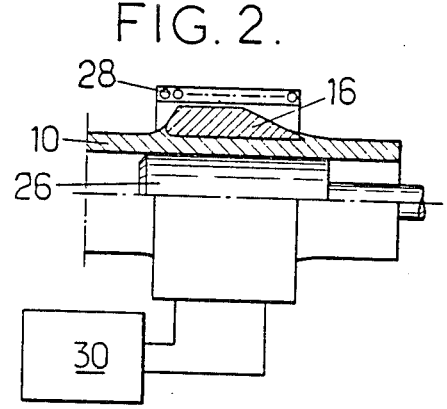
FIG. 3.
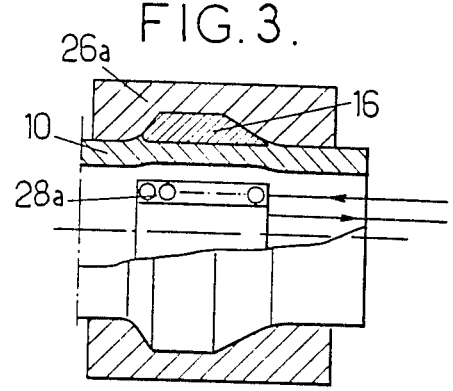
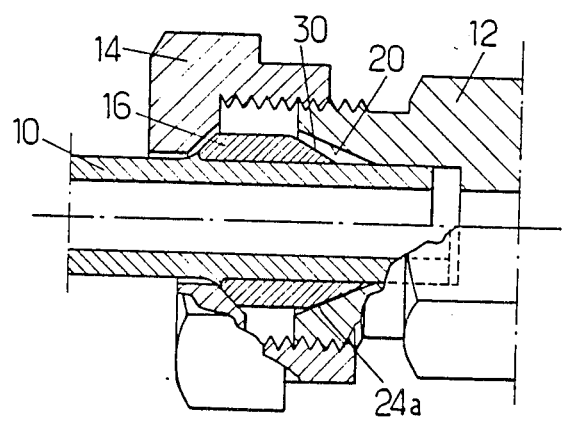
FIG. 4.

PROCESS FOR FORMING REMOVABLE FLUID TIGHT SEALING CONNECTIONS FOR HIGH PRESSURE DUCTS

BACKGROUND AND SUMMARY OF THE INVENTION

The present invention relates to a process for forming a removable sealing connection between a tube and a sleeve, of the type comprising an olive shaped piece called "olive" in what follows, fast with the end portion of the tube and a nut having a threaded connection with the sleeve and comprising means for deforming the olive so as to apply it sealingly against an internal face of the sleeve when the nut is screwed on the sleeve.

This process is widely used at the present time for sealingly connecting metal ducts and particularly ducts of small diameter (a few millimeters to a few tens of millimeters) which have to withstand high internal pressures (British Pat. No. 1 365 815).

Two solutions are generally used for securing the olive to the tube. A first solution consists in crimping the olive on the tube. In this case an olive may more particularly be used made from elastomer material and crimped by means of a metal ring. The second solution consists in using an olive made from a metal slightly harder than that of the tube. In this case, when the olive is compressed by the nut during a first precrimping operation, it becomes embedded in the tube and subsequently remains interlocked therewith. The tube is ready to be connected, provided with a nut, a sleeve and the precrimped sealing olive. In that case, for example, an olive may be used made from brass when the tube is made from copper, an olive made fom treated steel when the tube is made for stainless steel. In the latter case, a grooving operation must be carried out before precrimping.

FIG. 1 shows a removable sealed connection using the second solution. The connection is to be made between the end portion of a tube 10 and a sleeve 12 having a shoulder facing the endmost edge of tube 10 and a threaded portion for receiving a nut 14. With the sealing olive 16 positioned by precrimping on the tube, nut 14 is slid along tube 10. A clearance is provided between the latter and the shoulder of sleeve 12. Nut 14 is then screwed tight. Nut 14 has an internal tapered surface 18 which eomes into abutment with the olive and applies it against an internal frustoconical surface 20 of the sleeve. The pressure thus exerted on the olive deforms from the shape shown in dot-dash line to the shape shown with a continuous line in FIG. 1. Sealing is thus provided between olive 16 and tube 10 by an anchorage along line 22 and a curvilinear contact along line 23. It is provided, between olive 16 and sleeve 12, by abutting contact in the annular zone 24.

These known solutions however have different disadvantages. They do not guarantee a definitive and reliable crimping of the olive after numerous disassembly and reassembly operations. The sealing is only achieved along substantially linear contacts, which is unsatisfactory when the pressures considered are high. Before crimping the sealing olive in the case of a stainless steel tube, two operations must be carefully carried out using two specific tools: a grooving machine whose cutting wheel must be in perfect condition, and a pre-crimping unit. Furthermore, at least in the embodiment shown in FIG. 1, there is a concentration of forces which may cause minute cracks in the tube along line 22 and the creation of fatique points, to which pregrooving of the tube on which the olive is crimped further contributes. The tightening torque exerted must be exactly controlled, in order to provide sealing, by using a torque wrench.

It is an object of the invention to provide an improved process for forming a removable fluid tight connection of the above defined type. It is a more particular object to provide a process which overcomes the above disadvantages and guarantees long term reliability of the connection.

For that purpose, the olive is permanently secured to the tube by electromagnetic forming, whereby the connection is rendered fluid tight and the olive takes a reproducible and accurately defined shape.

Electromagnetic forming is a well known technique (British Pat. No. 2 086 284): it uses a burst of electromagnetic energy created by a brief high frequency discharge of high voltage electric energy in an inductive coil. It comprises two variants, known respectively under the name of "magneto forming" and "electroforming". In magneto forming, an electro-magnetic field propels the piece to be shaped, (which must be at least partially electrically conducting metal), at high speed against another piece forming a die whose shape it assumes. In electro forming (also known as electro-hydraulic forming), an electric pulse is applied to an explosive wire placed in an insulating and incompressible medium. The explosion creates a shock wave which is transmitted through the incompressible medium to the piece to be shaped so as to cause expansion thereof.

One or the other of the electro-magnetic forming processes will be selected depending on the diameter of the duct ånd the nature of the materials.

In the case of tubular ducts of small diameter (10 mm or so) and a few millimeters in thickness, crimping of the olive will be advantageously provided by shrinking using a magneto forming coil. This solution will be of particular interest for the pipes having an outer diameter of 12 mm and a thickness of two millimeters which are subjected to a pressure of from 200 to 400 bars in hydraulic control circuits.

When the diameter of the tube exceeds 20 mm, which is the general case in power transmission circuits, crimping may be obtained by expansion, using a magneto forming coil inserted in the tube. For smaller diameters, expansion crimping may be retained, but by electro forming using an explosive wire placed in the tube. Expansion crimping using a forming die has the advantage of providing, in a single operation crimping of the olive on the tube and suitable shaping thereof from a blank produced with wide tolerances. The forming die is more easily extracted than in the previous case. During such forming, there is no lengthening of the tube; the material is displaced in thickness and this deformation may be adjusted (FIG. 3). This technique further guarantees that the mechanical qualities of the stressed material (olive and tube) are retained and even provides surface hardening of the material by cold drawing.

The invention will be better understood from the following description of particular embodiments of the invention given by way of examples.

SHORT DESCRIPTION OF THE DRAWINGS

FIG. 1, already mentioned, shows a sealed connection between a tube and a sleeve formed by a prior art process, FIG. 2 shows schematically, in elevation and in half section, an electromagnetic induction coil used for shrinking an olive on a tube by magneto forming, FIG. 3, similar to FIG. 2, corresponds to expansion crimping, FIG. 4 is a sectional view of a connection in accordance with the invention, the parts being shown, in the upper part, in the position before tightening of the screw and, in the lower part, in the position after tightening.

DETAILED DESCRIPTION OF THE PREFERRED EMBODIMENTS

FIG. 2 shows schematically a method of crimping an olive on a tube 10, using magneto forming shrinkage. First a forming die 26, intended to prevent crushing of the tube during crimping, is inserted in the tube at the longitudinal level where olive 16 is to be fixed. Die 26, made from rigid material, will be removed from the assembly after crimping. To facilitate removal, an expandable mandrel may be used as a die. Another solution consists in forming it as a pocket containing an incompressible fluid, or else in placing an incompressible fluid such as oil in the tube which is then closed at both ends.

Then olive 16 is slid along tube 10 without need for precise positioning on the tube and, finally, the assembly is inserted into an electromagnetic induction coil 28 connected to generator 30 provided for applying an intense and pulsed discharge of electric energy. Generator 30 may be formed by known apparatuses, such as those produced in France by Barras-Provence under the trade name "GIPE", the principle of which is described in U.S. Pat. No. 2,976,907.

In the case of tubes having a larger diameter, typically exceeding 20 mm, magneto crimping by expansion may be used, as shown in FIG. 3. In this case, the coil 28a is placed inside the tube. A die 26a in several pieces assembled together is placed about the tube 10 and the blank intended to form olive 16. If the tube is made from a poorly conducting material, it may be lined with a propellent tube of electrically conducting metal such as aluminium.

That approach has the advantage of providing in a single operation shaping of olive 16 and crimping thereof on the tube from a blank which may be manufactured with wide tolerances. Despite the tolerances, the final shape of the olive is extremely accurate since it corresponds to the impression of the die.

Hereagain, an apparatus of a known type may be used such as the one already mentioned.

Expansion crimping may also be effected by electroforming using an explosive wire placed in the tube. Hereagain, an apparatus of the type already mentioned may be used: the electric pulsed discharge of the generator in the explosive wire creates a shock wave, in the incompressible fluid located within the tube and causes expansion thereof. This solution is a little more complex to use than the preceding one. On the other hand, it may be used even for inner diameters—less than 20 mm, and it does not require the tube to be of electrically conducting material.

The connection using an olive of a material fixed to a high pressure duct crimped by electromagnetic forming may be constituted as shown in FIG. 4, where the parts corresponding to those in FIG. 1 have the same reference number. For satisfactory tightness, the inner surface 20 of sleeve 12 has a conical shape whose angle at the apex is slightly less than, or at most equal to the slope of the front face 30 of the olive. When the latter is forced against inner surface 20 by tightening screw 14, the front face 30 is deformed and is applied against the face 20 over a large annular zone of development 24a. To arrive at this result, sleeve 12 will be formed from a material harder than the olive 16. Thus, sealing at each of the abutments of the olive (with sleeve 12, tube 10 and nut 14) is provided over extended annular zones, this providing great security even over extended periods.

A clearance should of course remain between the end surface of tube 10 and sleeve 12.

The nature of the metal used for forming the sealing olive is chosen so that its resiliency provides sealing when the nut is tightened on the sleeve, at each disassembly-assembly, without need of strict control of tightening. The high reliability of the seal between the tube and the olive is due to the fact that the process confers on the assembly a mechanical resistance which exceeds that of the weakest of the assembled parts; furthermore, the forces due to crimping are distributed and there is no concentration of high forces and so no fatigue point.

The crimping technique is moreover very economical (1 to 10 kJ), very rapid (a few tens of microseconds) and reproducible; the size of the formed and crimped sealing olive is very precise.

The invention is not limited to the particular embodiments which have been shown and described by way of examples. Numerous applications are possible, not only in the field of control circuits but also for power transmission, hydraulic ducting, and the like in fixed installations and mobile units.

I claim:

1. A process for forming a removable connection between a tube and a sleeve ensuring the sealing of high pressure ducts, comprising the steps of:
   providing a nut which is internally threaded for connection with external threads on the sleeve and which has an internal abutment surface,
   inserting the nut on the tube,
   providing a solid annular shaped part at least partially made from electrically conducting material,
   inserting the annular part on the tube,
   inserting a removable forming die into the tube,
   securing the annular part to the end portion of the tube over the whole length of the annular part by magneto forming, and
   screwing the nut on the sleeve for deforming the annular part with the abutment surface and applying the annular part sealingly against an internal face of the sleeve.

2. A process for forming a removable connection between a tube and a sleeve ensuring the sealing of high pressure ducts, comprising the steps of:
   providing a nut having threaded connection with the external threads on the sleeve and having an abutment surface,
   inserting the nut on the tube,
   providing a solid annular shaped part,
   inserting the annular part on the tube,
   applying a removable external die about the annular part,
   securing the annular part to the end portion of the tube over the whole length of the annular part by electromagnetic forming, and
   screwing the nut on the sleeve for deforming the annular part with the abutment surface and applying the annular part sealingly against an internal face of the sleeve.

3. An assembly for a releasable fluid tight connection between a tube and a sleeve, comprising:
an olive initially securely fixed on an end portion of the tube over the whole length thereof by electromagnetic forming; and
a nut having a threaded connection with the sleeve and comprising abutment means for deforming the olive and forcing it sealingly against an internal face of the sleeve when the nut is tightened on the sleeve whereby a sealing contact between said sleeve and said deforming means is obtained over a substantial surface.

4. A sealed connection according to claim 3, wherein the sleeve has an internal frusto-conical surface and said olive has an outer frusto-conical surface confronting said internal surface and wherein the opening angle of said internal surface is at most equal to the opening angle of said outer frusto-conical surface.

* * * * *